US008534824B2

(12) United States Patent
Roof et al.

(10) Patent No.: US 8,534,824 B2

(45) Date of Patent: Sep. 17, 2013

(54) METHODS OF ADJUSTING GLOSS OF IMAGES LOCALLY ON SUBSTRATES USING INK PARTIAL-CURING AND CONTACT LEVELING AND APPARATUSES USEFUL IN FORMING IMAGES ON SUBSTRATES

(75) Inventors: Bryan J. Roof, Newark, NY (US); Jacques K. Webster-Curley, Perry, NY (US); David M. Thompson, Webster, NY (US)

(73) Assignee: Xerox Corporation, Norwalk, CT (US)

(*) Notice: Subject to any disclaimer, the term of this patent is extended or adjusted under 35 U.S.C. 154(b) by 245 days.

(21) Appl. No.: 12/881,753

(22) Filed: Sep. 14, 2010

(65) Prior Publication Data

US 2012/0062667 A1 Mar. 15, 2012

(51) Int. Cl.

| | |
|---|---|
| ***B41J 2/01*** | (2006.01) |
| ***B41J 2/015*** | (2006.01) |
| ***B41J 2/395*** | (2006.01) |
| ***G01D 11/00*** | (2006.01) |

(52) U.S. Cl.

USPC .............. 347/102; 347/21; 347/100; 347/141

(58) Field of Classification Search

None

See application file for complete search history.

(56) References Cited

U.S. PATENT DOCUMENTS

| | | | | |
|---|---|---|---|---|
| 7,419,257 | B2 * | 9/2008 | Mouri et al. | 347/103 |
| 7,531,582 | B2 | 5/2009 | Toma et al. | |
| 7,559,639 | B2 | 7/2009 | Belelie et al. | |
| 7,665,835 | B2 | 2/2010 | Goredema et al. | |
| 7,714,040 | B2 | 5/2010 | Toma et al. | |
| 2006/0066704 | A1 * | 3/2006 | Nishida | 347/103 |
| 2007/0040885 | A1 * | 2/2007 | Kusunoki | 347/102 |
| 2007/0120930 | A1 | 5/2007 | Domoto et al. | |
| 2007/0123606 | A1 | 5/2007 | Toma et al. | |
| 2008/0122914 | A1 * | 5/2008 | Toma et al. | 347/100 |
| 2009/0085996 | A1 * | 4/2009 | Kasai | 347/100 |
| 2010/0101716 | A1 | 4/2010 | Roof et al. | |
| 2010/0101717 | A1 | 4/2010 | Roof | |
| 2010/0103235 | A1 | 4/2010 | Roof et al. | |

* cited by examiner

*Primary Examiner* — Stephen Meier

*Assistant Examiner* — Alexander C Witkowski

(74) *Attorney, Agent, or Firm* — Ronald E. Prass, Jr.; Prass LLP

(57) ABSTRACT

Apparatuses and methods for forming images on substrates in printing are provided and may include a first marking station for applying a first ink having a first color to a surface of a substrate, a first partial-curing station downstream from the first marking station, a second marking station downstream from the first partial-curing station for applying a second ink having a second color to the surface of the substrate, a second partial-curing station downstream from the second marking station, a leveling device for applying pressure to the substrate and the partially-cured first ink and second ink to level the first ink and second ink on the surface of the substrate, and a post-leveling curing device for irradiating the as-leveled first ink and second ink on the surface of the substrate to substantially-fully cure the first ink and the second ink.

29 Claims, 3 Drawing Sheets

METHODS OF ADJUSTING GLOSS OF IMAGES LOCALLY ON SUBSTRATES USING INK PARTIAL-CURING AND CONTACT LEVELING AND APPARATUSES USEFUL IN FORMING IMAGES ON SUBSTRATES

RELATED APPLICATIONS

This application is related to the applications entitled "METHODS OF FORMING IMAGES ON SUBSTRATES WITH INK PARTIAL-CURING AND CONTACT LEVELING AND APPARATUSES USEFUL IN FORMING IMAGES ON SUBSTRATES" (Ser. No. 12/881,715); "METHODS OF ADJUSTING GLOSS OF IMAGES ON SUBSTRATES USING INK PARTIAL-CURING AND CONTACT LEVELING AND APPARATUSES USEFUL IN FORMING IMAGES ON SUBSTRATES" (Ser. No. 12/881,802) and "METHODS OF TREATING INK ON POROUS SUBSTRATES USING PARTIAL CURING AND APPARATUSES USEFUL IN TREATING INK ON POROUS SUBSTRATES" (Ser. No. 12/881,837), which are each filed on the same date as the present application, commonly assigned to the assignee of the present application, and incorporated herein by reference in its entirety.

BACKGROUND

In printing processes, marking material is applied to substrates to form images. In these processes, pressure can be applied to the substrates and marking material by contact surfaces to level the marking material on the substrates. The marking material can offset to the surfaces, resulting in unsatisfactory fixed images.

It would be desirable to provide methods of forming images on substrates in printing and apparatuses for forming images on substrates that can form images having adjustable gloss with ink.

SUMMARY

Apparatuses and methods for forming images on substrates in printing are provided. An exemplary embodiment of the apparatuses comprises a first marking station for applying a first ink having a first color to a surface of a substrate; a first partial-curing station downstream from the first marking station including at least one first array of first light-emitting diodes (LEDs) for irradiating the first ink on the surface of the substrate with first radiation to partially-cure, and adjust gloss of, the first ink, each first LED of each first array of first LEDs being individually addressable to vary the intensity of the first radiation emitted therefrom as the substrate is passed by the at least one first array of first LEDs; a second marking station downstream from the first partial-curing station for applying a second ink having a second color to the surface of the substrate; a second partial-curing station downstream from the second marking station including at least one second array of second LEDs for irradiating the first ink and the second ink on the surface of the substrate with second radiation to further partially-cure the first ink and to partially-cure the second ink to adjust gloss of the first ink and the second ink, each second LED of each second array of second LEDs being individually addressable to vary the intensity of the second radiation emitted therefrom as the substrate is passed by the at least one second array of second LEDs; a leveling device for applying pressure to the substrate and the partially-cured first ink and second ink to level the first ink and second ink on the surface of the substrate; and a post-leveling curing device for irradiating the as-leveled first ink and second ink on the surface of the substrate to substantially-fully cure the first ink and the second ink.

DRAWINGS

DETAILED DESCRIPTION

Figure 1:
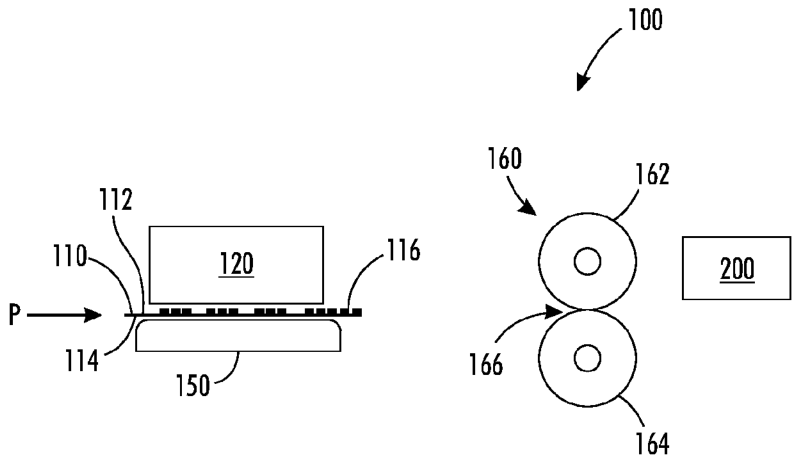
FIG. 1 depicts an exemplary embodiment of a printing apparatus for forming images on substrates with ink partial-curing and contact leveling of the images.

The disclosed embodiments include apparatuses for forming images on substrates in printing. An exemplary embodiment of the apparatuses comprises a first marking station for applying a first ink having a first color to a surface of a substrate; a first partial-curing station downstream from the first marking station including at least one first array of first light-emitting diodes (LEDs) for irradiating the first ink on the surface of the substrate with first radiation to partially-cure, and adjust gloss of, the first ink, each first LED of each first array of first LEDs being individually addressable to vary the intensity of the first radiation emitted therefrom as the substrate is passed by the at least one first array of first LEDs; a second marking station downstream from the first partial-curing station for applying a second ink having a second color to the surface of the substrate; a second partial-curing station downstream from the second marking station including at least one second array of second LEDs for irradiating the first ink and the second ink on the surface of the substrate with second radiation to further partially-cure the first ink and to partially-cure the second ink to adjust gloss of the first ink and the second ink, each second LED of each second array of second LEDs being individually addressable to vary the intensity of the second radiation emitted therefrom as the substrate is passed by the at least one second array of second LEDs; a leveling device for applying pressure to the substrate and the partially-cured first ink and second ink to level the first ink and second ink on the surface of the substrate; and a post-leveling curing device for irradiating the as-leveled first ink and second ink on the surface of the substrate to substantially-fully cure the first ink and the second ink.

The disclosed embodiments further include methods for forming images on substrates in printing. An exemplary embodiment of the methods comprises applying a first ink having a first color to a surface of a substrate with a first marking station; irradiating the first ink on the surface of the substrate with first radiation emitted by at least one first array of first light-emitting diodes (LEDs) of a first partial-curing station downstream from the first marking station, each first LED of each first array of first LEDs being individually addressable to vary the intensity of the first radiation emitted therefrom as the substrate is passed by the at least one first array of first LEDs to partially-cure, and adjust gloss of, the first ink; applying a second ink having a second color to the surface of the substrate with a second marking station downstream from the first partial-curing station; irradiating the second ink on the surface of the substrate with second radiation emitted by at least one second array of second light-emitting diodes (LEDs) of a second partial-curing station downstream from the second marking station, each second LED of each second array of second LEDs being individually addressable to vary the intensity of the second radiation emitted therefrom as the substrate is passed by the at least one second array of second LEDs to further partially-cure the first ink and to partially-cure the second ink to adjust gloss of the first ink and the second ink; applying pressure to the substrate and the partially-cured first ink and second ink with a leveling device to level the first ink and second ink on the surface of the substrate; and irradiating the as-leveled first ink and second ink on the surface of the substrate to substantially-fully cure the first ink and second ink.

Ultra-violet (UV) curable inks can be used to form images on substrates in printing. UV-curable inks applied to a substrate are exposed to UV radiation to cure the ink. During this exposure, photoinitiator substances contained in the ink are irradiated with the UV radiation, and the incident flux converts monomers in the ink into a cross-linked polymer matrix, resulting in a hard and durable mark on the substrate. However, for various applications it is desirable for the ink to be leveled prior to this UV curing. This leveling can produce more-uniform image gloss and mask missing jets of print heads. Additionally, certain print applications, such as packaging, may benefit from having thin ink layers of relatively-constant thickness on prints.

UV-curable phase change inks may have a gel-like consistency at ambient temperature. When these inks are heated from about ambient temperature to an elevated temperature, they undergo a phase change to a low-viscosity liquid. These inks can be heated until they change to a liquid and then applied to a substrate. Once the ink contacts the substrate, the inks cools and changes phase from the liquid phase back to its more-viscous, gel consistency.

At ambient temperature, UV-curable gel inks have very little cohesive strength prior to being cured. Moreover, these inks may be formulated to have good affinity to many types of materials. Consequently, conventional methods and devices used for flattening a layer of other ink types, such as a conventional fixing roll that may be used in xerography, are unsuitable for leveling gel inks prior to curing, because gel inks will tend to split and offset onto the device used to try to flatten it. It has been determined that radiation-curable inks, such as UV-curable gel inks, applied to substrates, can be exposed to radiation to partially-cure the inks prior to being contact leveled to allow the inks to be leveled with zero, or substantially no, offset of the inks to contact surfaces of the leveling device.

The term "curable" describes, for example, a material that may be cured via polymerization, including for example free radical routes, and/or in which polymerization is photoinitiated though use of a radiation-sensitive photoinitiator. The term "radiation-curable" refers, for example, to all forms of curing upon exposure to a radiation source, including light and heat sources and including in the presence or absence of initiators. Exemplary radiation-curing techniques include, but are not limited to, curing using ultraviolet (UV) light, for example having a wavelength of 200-400 nm or more rarely visible light, optionally in the presence of photoinitiators and/or sensitizers, curing using thermal curing, in the presence or absence of high-temperature thermal initiators (and which may be largely inactive at the jetting temperature), and appropriate combinations thereof.

As used herein, the term "partial-cure" means that the radiant energy directed onto the ink is effective to cause some photoinitiators contained in the ink to be activated such that only partial polymerization of the ink occurs. The ink may contain two or more photoinitiators where some are activated in part and some are not activated at all by the radiation used during partial-curing. As a result of this partial polymerization, the viscosity of the ink is increased sufficiently to allow the as-irradiated ink to be passed through a nip and subjected to pressure substantially without offset of the ink in the nip. When the substrate enters the nip, the partially-cured ink can flow or spread on the substrate when sufficient pressure is applied to the ink to provide the desired leveling of the ink on the substrate with zero, or substantially no, offset of the ink.

It has been further determined that because pigments contained in individual ink colors absorb and reflect radiation differently, the cure rate for different ink colors is different. For example, black ink cures more slowly than cyan, magenta or yellow inks. Consequently, black ink will have significantly less gloss than magenta or yellow inks when these inks are cured using the same irradiation conditions. The final image will have differential gloss.

However, in various applications, it is desirable to be able to locally modify image gloss. For example, it may be desirable to have glossy regions, such as glossy graphics or watermarks, each having a desired gloss, and also matte regions, such as text, on the same substrate. Image gloss can be locally modified by techniques, such as jetting a clear ink only in the desired locations. In these techniques, the additional cost of the equipment and the additional materials cost per page mean results in pages that contain this addressable gloss being more expensive to produce.

In light of these observations, methods of forming images on substrates in printing and apparatuses for forming images on substrates in printing are provided. The methods and apparatuses use partial-curing of ink applied to substrates to affect image gloss. In embodiments, the irradiation conditions used for the partial-curing of inks can be adjusted to allow local modification of gloss level of images in real time.

FIG. 1 depicts an exemplary embodiment of a printing apparatus 100 useful in forming images on substrates with ink. The apparatus 100 includes a marking/partial-curing device 120, a leveling device 160, and a post-leveling curing device 200, arranged along the process direction, P. A substrate 110 including a front surface 112 and an opposite back surface 114 is shown. The marking/partial-curing device 120 deposits ink 116 onto the front surface 112 of the substrate 110 and irradiates the as-applied ink 116 with radiant energy effective to partially-cure the ink 116. The leveling device 160 levels the partially-cured ink 116 on the front surface 112 of the substrate 110 by applying pressure to the ink 116. The post-leveling curing device 200 irradiates the as-leveled ink 116 with radiant energy. The post-leveling curing device 200 can substantially fully cure the ink 116.

The substrate 110 is a sheet, such as a sheet of plain paper, a polymer film, metal foil, packaging material, or the like. In other embodiments, the substrate can be a continuous web of material, such as plain paper, a polymer film, metal foil, packaging material, or the like. In embodiments, the marking/partial-curing device 120 and the post-leveling curing device 200 are stationary and the substrate 110 is moved past these devices to deposit ink onto and then irradiate the layer of ink 116.

Figure 2:
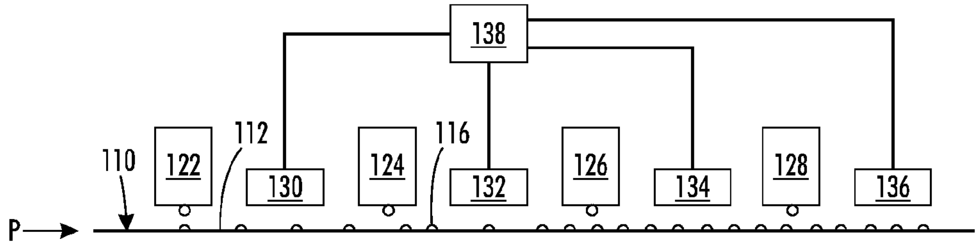
FIG. 2 depicts an exemplary embodiment of the marking/partial-curing device of the printing apparatus of FIG. 1.

Embodiments of the marking/partial-curing device 120 include at least two marking stations and at least two partial-curing stations. Each marking station can apply a different color of ink to the substrate 110. FIG. 2 depicts an exemplary embodiment of the marking/partial-curing device 120. The marking/partial-curing device 120 includes a first marking station 122, second marking station 124, third marking station 126, and fourth marking station 128 arranged in this order along the process direction P.

Each of the first marking station 122, second marking station 124, third marking station 126 and fourth marking station 128 can include print heads arranged in a "direct-to-substrate" arrangement to deposit ink droplets on the front surface 112 of the substrate 110 advancing in the process direction P. For example, the print heads can be heated piezoelectric print heads, or the like.

The marking/partial-curing device 120 further includes a first partial-curing station 130 positioned between the first marking station 122 and the second marking station 124, a second partial-curing station 132 positioned downstream from the first partial-curing station 130 and between the second marking station 124 and the third marking station 126, a third partial-curing station 134 positioned downstream from the second partial-curing station 132 and between the third marking station 126 and the fourth marking station 128, and a fourth partial-curing station 136 positioned downstream from the fourth marking station 128. The first partial-curing station 130, second partial-curing station 132, third partial-curing station 134 and fourth partial-curing station 136 are connected in a conventional manner to a controller 138 configured to control their operation in printing.

Each of the first marking station 122, second marking station 124, third marking station 126 and fourth marking station 128 can apply a different primary color of ink to the front face 112 of the substrate 110. For example, these marking stations can use the subtractive primary colors cyan, magenta and yellow with black ink. The print heads can place different color separations onto the front surface 112 to build a desired full-color image according to input digital data. In terms of difficulty of curing, black ink is most difficult to cure, followed by cyan ink, then magenta ink and then yellow ink. In the marking/partial-curing device 120, the order that different ink colors are applied to a substrate to form a multicolor image can be from the most-difficult to cure ink color to the least-difficult to cure ink color of the different ink colors that are applied. For example, the first marking station 122 can apply black ink, the second marking station 124 can apply cyan ink, the third marking station 126 can apply magenta ink, and the fourth marking station 128 can apply yellow ink to a substrate to form a full-color image. In this arrangement of the marking stations, the as-deposited black ink is irradiated by each of the first partial-curing station 130, second partial-curing station 132, third partial-curing station 134 and fourth partial-curing station 136 prior being leveled at the leveling device 160, as the substrate 110 is advanced along the process direction P. The black ink is progressively further partially-cured by radiant energy emitted at the first partial-curing station 130, second partial-curing station 132, third partial-curing station 134 and fourth partial-curing station 136 as the substrate 110 advances. The as-deposited cyan ink is exposed to radiation at the second partial-curing station 132, third partial-curing station 134 and fourth partial-curing station 136; the magenta ink is exposed to radiation at the third partial-curing station 134 and fourth partial-curing station 136; and the yellow ink is exposed to radiation only at the fourth partial-curing station 136. By arranging the marking stations and partial-curing stations of the marking/partial-curing device 120 in this manner, the black ink applied to a substrate is subjected to the most partial-curing to increase its viscosity, the cyan ink the second most partial-curing, the magenta ink the third most partial-curing, and the yellow ink the least partial-curing to modify the gloss of these inks.

The dosage of radiant energy applied to each ink color deposited on the substrate 110 can be controlled by adjusting the radiation intensity and/or dwell. The intensity of the radiation emitted by each of the first partial-curing station 130, second partial-curing station 132, third partial-curing station 134 and fourth partial-curing station 136; the transport speed of the substrate 110 past these partial-curing stations; and the number of radiant energy sources of each of these partial-curing stations can be selected to control radiation dosage.

The ink has a composition that allows it to be cured using radiant energy to fix robust images onto substrates. The ink can comprise ultraviolet light (UV)-curable ink containing one or more photoinitiator materials. UV-curable inks can be heated to an elevated temperature and jetted while at a low viscosity. When these inks impinge on a cooler substrate, such as paper at ambient temperature, the inks cool to the substrate temperature. During cooling, the inks become increasingly viscous. When the UV-curable ink is exposed to UV radiation, polymerization and cross-linking occurs in the ink, which further increases its viscosity.

The UV-curable inks used in embodiments can include curable gellator and/or curable wax components.

Exemplary inks that can be used to form images on substrates in embodiments of the disclosed methods and apparatuses are described in U.S. Pat. No. 7,665,835, which discloses a phase change ink comprising a colorant, an initiator, and an ink vehicle; in U.S. Patent Application Publication No. 2007/0123606, which discloses a phase change ink comprising a colorant, an initiator, and a phase change ink carrier; and in U.S. Pat. No. 7,559,639, which discloses a radiation curable ink comprising a curable monomer that is liquid at 25° C., curable wax and colorant that together form a radiation curable ink, each of which is incorporated herein by reference in its entirety.

The print heads of the marking/partial-curing device 120 can be used to heat phase-change inks, for example, to a sufficiently-high temperature to reduce their viscosity for jetting as droplets onto the substrate 110. When a phase-change ink impinges on the substrate 110, the as-deposited ink rapidly cools and develops a gel consistency on the substrate 110. Due to this rapid cooling, the phase-change ink does not have sufficient time to level on the front surface 112 of the substrate 110 before developing the gel consistency.

In embodiments of the printing apparatus 100, each ink color of the as-deposited ink 116 on the front surface 112 of the substrate 110 is irradiated by the marking/partial-curing device 120 with radiant energy effective to partially-cure the ink. As a result of this partial polymerization, the viscosity and cohesion of the ink are increased sufficiently to allow the as-irradiated ink to be passed through a nip and subjected to pressure without offset of the ink in the nip. When the substrate 110 enters the nip, the partially-cured ink 116 has viscosity and hardness characteristics that allow it to flow or spread on the front surface 112 of the substrate 110 when sufficient pressure is applied to provide the desired leveling of the ink 116 on the front surface 112.

Figure 3:
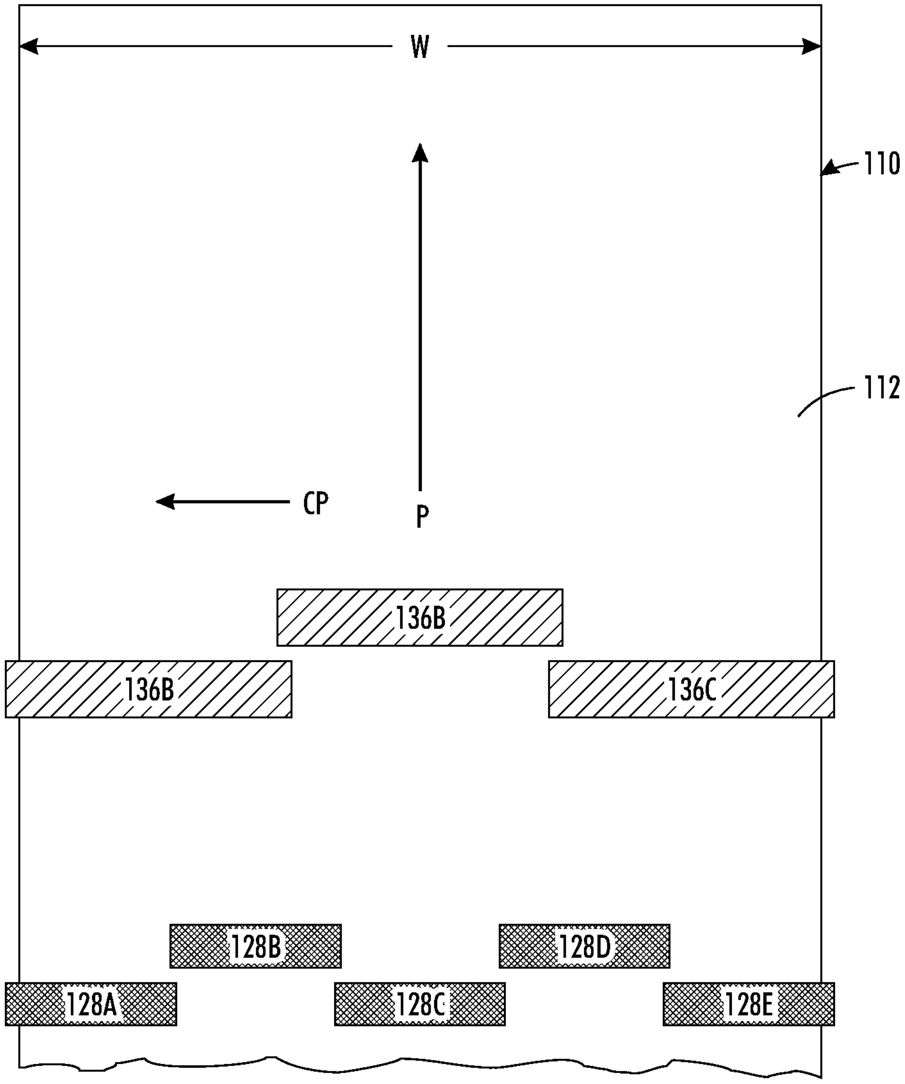
FIG. 3 depicts an exemplary marking station and partial curing station of the marking/partial-curing device.

Each of the first partial-curing station 130, second partial-curing station 132, third partial-curing station 134 and fourth partial-curing station 136 includes one or more radiant energy sources. FIG. 3 depicts an exemplary embodiment of the fourth marking station 128 and the fourth partial-curing station 136. As shown, the fourth marking station 128 includes print heads 128A, 128B, 128C, 128D and 128E. The fourth partial-curing station 136 includes radiant energy sources 136A, 136B and 136C. The print heads 128A, 128B, 128C, 128D and 128E and the radiant energy sources 136A, 136B and 136C both have a staggered arrangement. The first marking station 122, second marking station 124 and third marking station 126 can include the same number, type and arrangement of print heads as the fourth marking station 128. The first partial-curing station 130, second partial-curing station 132 and third partial-curing station 134 can include the same number, type and arrangement of radiant energy sources as the fourth marking station 128.

As shown in FIG. 3, the substrate 110 has a width, W, in the cross-process direction, CP, which is perpendicular to the process direction P. In the illustrated embodiment, the print heads 128A, 128B, 128C, 128D and 128E and the radiant energy sources 136A, 136B and 136C both have a total length in the cross-process direction CP that exceeds the width W of the substrate 110. The width W may be the maximum width of substrates used in the printing apparatus 100.

Figure 4:
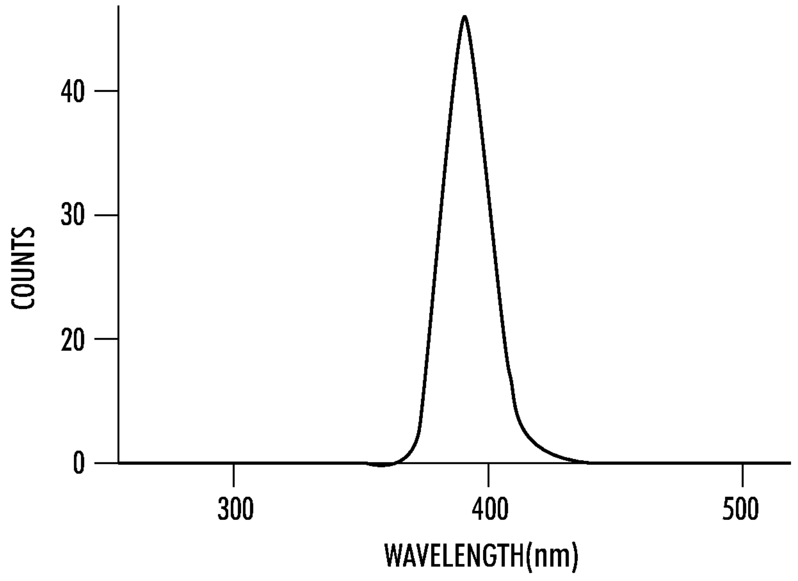
FIG. 4 depicts an exemplary spectrum of radiant energy that may be emitted by radiant energy sources of the partial-curing stations of the marking/partial-curing device of FIG. 2.

The radiant energy sources of the first partial-curing station 130, second partial-curing station 132, third partial-curing station 134 and fourth partial-curing station 136 can comprise one or more light-emitting diode (LED) arrays, or the like. For example, the radiant energy sources 136A, 136B and 136C shown in FIG. 3 can each comprise an LED array including multiple LEDs positioned along the cross-process direction CP. The radiant energy sources of the partial-curing stations can be selected to emit radiant energy having a spectrum that is optimized for the ink compositions used in printing in order to produce optimized partial-curing of the ink 116. The spectrum of the radiant energy is generally provided by a graph giving the intensity of the radiant energy at a range of wavelengths extending from the far UV (about 100 nm wavelength) to the near UV (about 400 nm wavelength). FIG. 4 depicts an exemplary spectrum of the radiant energy emitted by the pre-curing device 140.

During partial-curing, the temperature of the substrate 110 and layer of ink 116 can be controlled using a temperature-controlled platen 150. For example, the platen 150 can be operated at a temperature of about 10° C. to about 30° C., such as about 15° C. to about 20° C., to control the temperature of the substrate 110 and ink 116 to the desired temperature. During partial-curing, the ink 116 may be at ambient temperature, or at a temperature below or above ambient temperature.

In embodiments of the marking/partial-curing device 120, in each of the first partial-curing station 130, second partial-curing station 132, third partial-curing station 134 and fourth partial-curing station 136, the individual irradiating elements (e.g., LEDs) of each radiant energy source are independently addressable to allow image gloss to be modified locally on a substrate. Image gloss can be modified along length and width dimensions of substrates.

For example, in embodiments of the marking/partial-curing device 120 in which each of the first partial-curing station 130, second partial-curing station 132, third partial-curing station 134 and fourth partial-curing station 136 includes one or more LED arrays, the individual LEDs of the array(s) can be independently addressed for each of the first partial-curing station 130, second partial-curing station 132, third partial-curing station 134 and fourth partial-curing station 136. For example, in the fourth partial-curing station 136 shown in FIG. 3, the individual LEDs of the LED array of each of the radiant energy sources 136A, 136B and 136C can be independently addressed. This addressability allows radiant energy emission to be controlled along the process and cross-process directions in the printing apparatus 100 as substrates are advanced past the radiant energy sources 136A, 136B and 136C. The LEDs can be addressed in real time, under control of the controller 138 (FIG. 2), as the substrate 110 advances past the fourth partial-curing station 136. For each individual LED of the radiant energy sources 136A, 136B and 136C, the intensity of the emitted radiant energy can be increased or decreased, on command and in real time, as the substrate 110 advances past the fourth partial-curing station 136. Individual LEDs can also be turned ON or OFF. Selectively adjusting the intensity of radiant energy emission of the individual LEDs in LED arrays allows the final image to have the desired gloss level with respect to length and width dimensions of a substrate.

The individual LEDs of each of the first partial-curing station 130, second partial-curing station 132 and third partial-curing station 134 are also selectively addressable, in real time, as the substrate 110 advances past these partial-curing stations. In this manner, each ink color applied to the substrate 110 can be partially-cured with addressable LEDs as the substrate 110 advances. The amount of radiant energy exposure of selected different regions on a substrate can be controlled to balance gloss in some regions, raise gloss in other regions, or lower gloss in other regions.

In embodiments, the printing apparatus 100 can include a component having internal look-up capabilities for control of the radiant energy emission by the partial curing stations of the marking/partial-curing station 120 in real time. The emitted radiant energy intensity as a function of time for each LED of the one or more LED arrays of each of the first partial-curing station 130, second partial-curing station 132, third partial-curing station 134 and fourth partial-curing station 136 can be mapped to the desired final gloss of the final image over the imaged surface of the substrate 110. The device can have internal look-up capabilities for various final images. The sequence of the variation in radiant energy intensity of the individual LEDs of the LED arrays for a given final image can be timed with respect to the position and travel speed of the substrate 110 past the marking/partial-curing device 120 to achieve the desired radiant energy exposure over the entire imaged region of the front surface 112 of the substrate 110 to result in the desired final image. For example, for forming images on sheets, the leading edge of the sheets approaching the marking/partial curing device 120 can be sensed by a sensor to initiate the sequence of operation of the LEDs.

After the substrate 110 has advanced past the marking/partial-curing station 120, the partially-cured ink 116 has viscosity and cohesion characteristics that allow it to be leveled by the leveling device 160 to spread the ink on the front surface 112 to increase the line width of the layer of ink 116. The leveling device 160 includes members having opposed surfaces for applying pressure to the ink 116 on the substrate 110. The members can include two rolls; a first roll and a belt provided on a second roll; or two belts.

Figure 5:
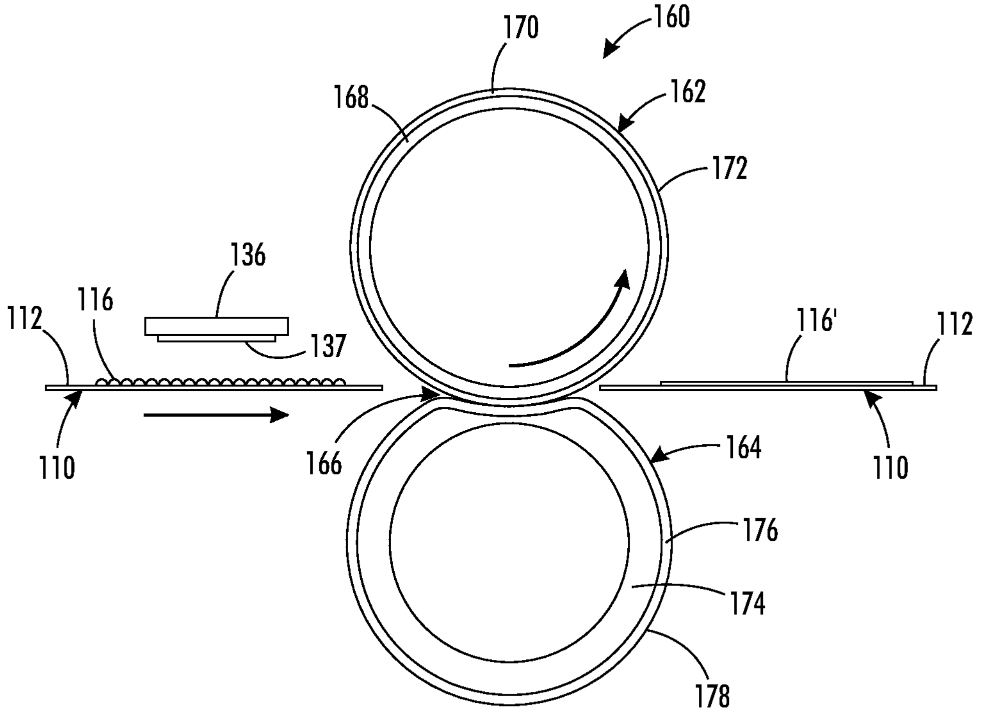
FIG. 5 shows a substrate including a front surface on which ink is disposed prior to entering a nip of a leveling device, and also showing the substrate after passing through the nip.

FIG. 5 depicts an exemplary embodiment of the leveling device 160, which includes a leveling roll 162 and a pressure roll 164. The fourth partial-curing station 136 including an LED array 137 is also shown. The leveling roll 162 and the pressure roll 164 form a nip 166 at which the substrate 110 and ink 116 are subjected to sufficient pressure to level the partially-cured ink 116 to produce the leveled layer of ink 116'. Typically, the pressure applied at the nip 166 may range of about 10 psi to about 800 psi, such as about 30 psi to about 120 psi, to produce sufficient leveling of the ink 116.

The leveling roll 162 can be made from various materials. For example, the illustrated leveling roll 162 includes a core 168 and an outer layer 170. The core 168 can comprise a suitable metal, such as aluminum, an aluminum alloy, or the like. The outer layer 170 includes the outer surface 172. In embodiments, the outer layer 170 can be comprised of a durable, hydrophilic material. In embodiments, the outer layer 170 can be comprised of a polymer having suitable properties, such as a fluorinated polymer, or the like. The outer layer 170 can be applied, e.g., as a coating over the core 168.

The pressure roll 164 can be made from various materials. The illustrated pressure roll 164 includes a core 174 and an outer layer 176 overlying the core 174. In embodiments, the core 174 is comprised of a relatively-hard material. For example, the core 174 can be comprised of a suitable metal, such as steel, stainless steel, or the like. The outer layer 176 includes an outer surface 178 and can be comprised of a material that is elastically deformed by contact with the leveling roll 162 to form the nip 166. For example, the outer layer 176 can be comprised of silicone rubber, or the like.

In embodiments, a release liquid can be applied to the outer surface 172 of the leveling roll 162 to wet the outer surface 172 to aid in the reduction of image offset during leveling. For example, the release liquid can be comprised substantially of water, with an effective amount of added detergent to reduce surface tension.

In embodiments, the leveling device 160 does not include a thermal energy source that actively heats either of the outer surface 172 of the leveling roll 162 or the outer surface 178 of the pressure roll 164. In these embodiments, the outer surfaces 172 and 178 apply pressure to the substrate 110 and ink 116 at the nip 166 to level the ink without actively heating the substrate 110 and ink 116. In embodiments of the leveling device that include one or more belts that form at least one of the leveling surfaces, the leveling device may not include a thermal energy source that actively heats either of the leveling surfaces.

In embodiments, the outer surface 172 of the leveling roll 162 and/or the outer surface 178 of the pressure roll 164 can be actively cooled to a desired temperature using one or more internal and/or external cooling devices. In embodiments of the leveling device that include one or more belts forming at least one of the leveling surfaces, the belt(s) may be actively cooled to a desired temperature by one or more cooling devices.

In the apparatus 100, the post-leveling curing device 200 includes at least one radiant energy source that is operable to emit radiant energy having a spectrum effective to substantially fully cure the ink 116 subsequent to the leveling of the ink 116 by the leveling device 160. In embodiments, the spectrum of the radiant energy source(s) of the post-leveling curing device 200 can be the same as, or can be different from, the spectrum of the radiant energy emitted by the radiant energy sources of the marking/partial-curing device 120. For example, the post-leveling curing device 200 can comprise a UV-LED array that emits at a different peak wavelength and intensity than the radiant energy sources of the marking/partial-curing device 120.

It will be appreciated that various ones of the above-disclosed, as well as other features and functions, or alternatives thereof, may be desirably combined into many other different systems or applications. Also, various presently unforeseen or unanticipated alternatives, modifications, variations or improvements therein may be subsequently made by those skilled in the art, which are also intended to be encompassed by the following claims.

What is claimed is:

1. An apparatus for forming an image on a substrate in printing, comprising:

a first marking station for applying a first radiation-curable gel ink having a first color to a surface of a substrate;

a first partial-curing station downstream from the first marking station including at least one first array of first light-emitting diodes (LEDs) for irradiating the first ink on the surface of the substrate with first radiation to partially-cure, and adjust gloss of, the first ink, each first LED of each first array of first LEDs being individually addressed to vary intensity of the first radiation emitted therefrom as the substrate is passed by the at least one first array of first LEDs;

a second marking station downstream from the first partial-curing station for applying a second radiation-curable gel ink having a second color to the surface of the substrate;

a second partial-curing station downstream from the second marking station including at least one second array of second LEDs for irradiating the first ink and the second ink on the surface of the substrate with second radiation to further partially-cure the first ink and to partially-cure the second ink to adjust gloss of the first ink and the second ink, each second LED of each second array of second LEDs being individually addressed to vary intensity of the second radiation emitted therefrom as the substrate is passed by the at least one second array of second LEDs;

a leveling device configured to apply pressure to the substrate and the partially-cured first ink and second ink to level the first ink and second ink on the surface of the substrate whereby as-leveled first ink and second ink is formed on the surface of the substrate; and a post-leveling curing device configured to irradiate the as-leveled first ink and second ink on the surface of the substrate to substantially-fully cure the first ink and the second ink.

2. The apparatus of claim 1, wherein each first array of first LEDs and each second array of second LEDs is connected to a controller configured to individually address each first LED and each second LED.

3. The apparatus of claim 1, wherein:

the at least one first array of first LEDs comprises at least two first arrays of first LEDs positioned in a staggered arrangement; and the at least one second array of second LEDs comprises at least two second arrays of second LEDs positioned in a staggered arrangement.

4. The apparatus of claim 1, wherein:

the first ink and the second ink comprise ultraviolet (UV)-curable ink; and the first radiation and the second radiation comprise UV radiation.

5. The apparatus of claim 1, wherein the leveling device comprises a first member, a second member and a nip formed by the first member and second member, the first member and second member being configured to apply pressure to the partially-cured first ink and second ink when the substrate is received at the nip to level the first ink and second ink on the surface of the substrate, the substrate being a printable sheet or continuous web.

6. The apparatus of claim 5, wherein:

the first member comprises a first roll; and the second member comprises a second roll.

7. The apparatus of claim 5, wherein:

the first member comprises a first belt; and/or the second member comprises a second belt.

8. The apparatus of claim 5, wherein the first member comprises a hydrophilic material defining a leveling surface.

9. The apparatus of claim 5, wherein the first member includes a first surface, the second member includes a second surface, and the first surface and second surface form a nip and are not actively heated.

10. The apparatus of claim 5, wherein the first member includes a first surface, the second member includes a second surface, the first surface and second surface form a nip, and at least one of the first surface and second surface is actively cooled by at least one cooling device.

11. The apparatus of claim 1, further comprising a cooling device for cooling the substrate while the first ink and second ink are applied to the substrate.

12. The apparatus of claim 1, further comprising:

a third marking station downstream from the second partial-curing station for applying a third radiation-curable gel ink having a third color to the surface of the substrate;

a third partial-curing station downstream from the third marking station including at least one third array of third LEDs for irradiating the first ink, second ink and third ink on the surface of the substrate with third radiation to further partially-cure the first ink and second ink and to partially-cure the third ink to adjust gloss of the first ink, second ink and third ink, each third LED of each third array of third LEDs being individually addressed to vary intensity of the third radiation emitted therefrom as the substrate is passed by the at least one third array of third LEDs;

a fourth marking station downstream from the third partial-curing station for applying a fourth radiation-curable gel ink having a fourth color to the surface of the substrate; and a fourth partial-curing station downstream from the fourth marking station including at least one fourth array of fourth LEDs for irradiating the first ink, second ink, third ink and fourth ink on the surface of the substrate with fourth radiation to further partially-cure the first ink, second ink and third ink and to partially-cure the fourth ink to adjust gloss of the first ink, second ink, third ink and fourth ink, each fourth LED of each fourth array of fourth LEDs being individually addressed to vary intensity of the fourth radiation emitted therefrom as the substrate is passed by the at least one fourth array of fourth LEDs;

wherein the leveling device applies pressure to the partially-cured first ink, second ink, third ink and fourth ink to level the first ink, second ink, third ink and fourth ink on the surface of the substrate; and wherein the post-leveling curing device irradiates the as-leveled first ink, second ink, third ink and fourth ink on the surface of the substrate to substantially-fully cure the first ink, second ink, third ink and fourth ink.

13. The apparatus of claim 12, wherein each first array of first LEDs, each second array of second LEDs, each third array of third LEDs and each fourth array of fourth LEDs is connected to a controller configured to individually address each first LED, each second LED, each third LED and each fourth LED.

14. The apparatus of claim 12, wherein:

the at least one first array of first LEDs comprises at least two first arrays of first LEDs positioned in a staggered arrangement;

the at least one second array of second LEDs comprises at least two second arrays of second LEDs positioned in a staggered arrangement;

the at least one third array of third LEDs comprises at least two third arrays of third LEDs positioned in a staggered arrangement; and the at least one fourth array of fourth LEDs comprises at least two fourth arrays of fourth LEDs positioned in a staggered arrangement.

15. The apparatus of claim 12, wherein:

the first ink comprises black ink;

the second ink comprises cyan ink;

the third ink comprises magenta ink;

the fourth ink comprises yellow ink; and the substantially-fully cured first ink, second ink, third ink and fourth ink have about the same gloss.

16. A method of forming an image on a substrate in printing, comprising:

applying a first radiation-curable gel ink having a first color to a surface of a substrate with a first marking station;

irradiating the first ink on the surface of the substrate with first radiation emitted by at least one first array of first light-emitting diodes (LEDs) of a first partial-curing station downstream from the first marking station, each first LED of each first array of first LEDs being individually addressed to vary intensity of the first radiation emitted therefrom as the substrate is passed by the at least one first array of first LEDs to partially-cure, and adjust gloss of, the first ink;

applying a second radiation-curable gel ink having a second color to the surface of the substrate with a second marking station downstream from the first partial-curing station;

irradiating the second ink on the surface of the substrate with second radiation emitted by at least one second array of second light-emitting diodes (LEDs) of a second partial-curing station downstream from the second marking station, each second LED of each second array of second LEDs being individually addressed to vary intensity of the second radiation emitted therefrom as the substrate is passed by the at least one second array of second LEDs to further partially-cure the first ink and to partially-cure the second ink to adjust gloss of the first ink and the second ink;

applying pressure to the substrate and the partially-cured first ink and second ink with a leveling device to level the first ink and second ink on the surface of the substrate whereby an as-leveled first ink and as-leveled second ink is formed on the substrate; and irradiating the as-leveled first ink and second ink on the surface of the substrate to substantially-fully cure the first ink and second ink.

17. The method of claim 16, further comprising controlling each first LED of each first array of first LEDs and each second LED of each second array of second LEDs using a controller connected to the first partial-curing station and second partial-curing station.

18. The method of claim 17, wherein the controller controls each first array of first LEDs and each second LED of each second array of second LEDs in real time as the substrate passes the first partial-curing station and second partial-curing station.

19. The method of claim 16, wherein the substantially-fully cured first ink and second ink form an image including at least one first region having a first gloss and at least one second region having a second gloss different from the first gloss.

20. The method of claim 19, wherein each first region has a glossy surface and each second region has a matte surface.

21. The method of claim 16, wherein:

the at least one first array of first LEDs comprises at least two first arrays of first LEDs positioned in a staggered arrangement; and the at least one second array of second LEDs comprises at least two second arrays of second LEDs positioned in a staggered arrangement.

22. The method of claim 16, wherein:

the first ink and the second ink comprise ultraviolet (UV)-curable ink; and the first radiation and the second radiation comprise UV radiation.

23. The method of claim 22, wherein each of the first ink and the second ink comprises at least one monomer, a curable gellator component, and optionally a curable wax component.

24. The method of claim 16, wherein the leveling device comprises a first member, a second member and a nip formed by the first member and second member, the first member and second member being configured to apply pressure to the partially-cured first ink and second ink when the substrate is received at the nip to level the first ink and second ink on the surface of the substrate, the substrate being a printable sheet or continuous web.

25. The method of claim 24, wherein the first member and the second member are not actively heated.

26. The method of claim 24, wherein at least one of the first member and the second member is actively cooled by at least one cooling device.

27. The method of claim 16, wherein the substrate is cooled while the first ink and second ink are applied to the substrate.

28. The method of claim 16, further comprising:

applying a third radiation-curable gel ink having a third color to the surface of a substrate with a third marking station;

irradiating the third ink on the surface of the substrate with third radiation emitted by at least one third array of third light-emitting diodes (LEDs) of a third partial-curing station downstream from the third marking station, each third LED of each third array of third LEDs being individually addressed to vary intensity of the third radiation emitted therefrom as the substrate is passed by the at least one third array of first LEDs to further partially-cure the first ink and second ink and partially-cure the third ink to adjust gloss of the first ink, second ink and third;

applying a fourth radiation-curable gel ink having a fourth color to the surface of the substrate with a fourth marking station downstream from the third partial-curing station;

irradiating the fourth ink on the surface of the substrate with fourth radiation emitted by at least one fourth array of fourth light-emitting diodes (LEDs) of a fourth partial-curing station downstream from the fourth marking station, each fourth LED of each fourth array of fourth LEDs being individually addressed to vary intensity of the fourth radiation emitted therefrom as the substrate is passed by the at least one fourth array of first LEDs to further partially-cure the first ink, second ink and third ink and to partially-cure the fourth ink to adjust gloss of the first ink, second ink, third ink and fourth ink;

applying pressure to the substrate and the partially-cured first ink, second ink, third ink and fourth ink with the leveling device to level the first ink, second ink, third ink and fourth ink on the surface of the substrate; and irradiating the as-leveled first ink, second ink, third ink and fourth ink on the surface of the substrate to substantially-fully cure the first ink, second ink, third ink and fourth ink.

29. The method of claim 28, wherein:

the first radiation, second radiation, third radiation and fourth radiation comprise ultraviolet (UV) radiation;

the first ink comprises black UV-curable ink;

the second ink comprises cyan UV-curable ink;

the third ink comprises magenta UV-curable ink;

the fourth ink comprises yellow UV-curable ink.

* * * * *